United States Patent
Fontignie et al.

(10) Patent No.: US 9,058,231 B2
(45) Date of Patent: Jun. 16, 2015

(54) DEPLOYMENT OF OPERATING SYSTEMS WITH DETECTION OF LOOP CONDITIONS

(75) Inventors: Jacques Fontignie, Onex (CH); Francesco Latino, Bari (IT); Bernardo Pastorelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/545,653

(22) Filed: Jul. 10, 2012

(65) Prior Publication Data

US 2013/0019239 A1    Jan. 17, 2013

(30) Foreign Application Priority Data

Jul. 11, 2011   (IT) .............................. MI2011A1287

(51) Int. Cl.
*G06F 9/44* (2006.01)
*G06F 9/445* (2006.01)

(52) U.S. Cl.
CPC ...................................... *G06F 8/61* (2013.01)

(58) Field of Classification Search
CPC ............... G06F 8/60; G06F 8/61; G06F 8/65; G06F 8/67; G06F 9/542; G06F 9/4443
USPC ................................................ 717/168–178
See application file for complete search history.

(56) References Cited

U.S. PATENT DOCUMENTS

| | | | |
|---|---|---|---|
| 6,601,096 B1 | 7/2003 | Lassiter, Jr. | |
| 6,816,964 B1 | 11/2004 | Suzuki et al. | |
| 7,073,053 B1 | 7/2006 | Oz et al. | |
| 7,171,479 B2 | 1/2007 | Buchanan et al. | |
| 2007/0112944 A1* | 5/2007 | Zapata et al. | 709/221 |
| 2007/0266120 A1 | 11/2007 | Tallieu et al. | |
| 2008/0046708 A1* | 2/2008 | Fitzgerald et al. | 713/2 |
| 2008/0201707 A1* | 8/2008 | Lavery et al. | 717/178 |

FOREIGN PATENT DOCUMENTS

| | | |
|---|---|---|
| GB | 2446094 A | 7/2008 |
| IE | 20040139 A1 | 10/2004 |

OTHER PUBLICATIONS

Fujitsu Technology Solutions, "MDP Multi-Deployment Platform", Published by Department: Product Marketing X86 Server, 2009, pp. 1-22.

R. Buttner et al., "Bootmanage PXE Toolkit User Manual", Bootix Technology GMBH, Geranienstrasse 19, D-41466 Neuss, 1999, pp. 1-110.

Paragon Software Group, "PC Deployment Over Network Using PXE Environment", Workshop, September 2005, pp. 1-32.

* cited by examiner

*Primary Examiner* — Li B Zhen
*Assistant Examiner* — Duy Khuong Nguyen
(74) *Attorney, Agent, or Firm* — A. Bruce Clay (57) ABSTRACT

A deployment request from a target machine is received for an operating system on a source machine. Tracking information indicative of an evolution of the deployment of the operating system is received. Deployment of the operating system is enabled or refused in response to each deployment request according to the tracking information.

12 Claims, 6 Drawing Sheets

DEPLOYMENT OF OPERATING SYSTEMS WITH DETECTION OF LOOP CONDITIONS

BACKGROUND

The present invention generally relates to the data-processing field, and, more specifically, to the deployment of operating systems with detection of loop conditions.

Deployment of operating systems is a time consuming activity, particularly in a large data-processing system comprising a high number of target machines (onto which the operating systems are to be deployed). A typical example is the deployment of operating systems onto target machines comprising bare-metal machines with no operating system installed, thereon, or of failed machines needing the operating system restored (commonly referred to as pristine machines).

The deployment of a specific operating system onto a generic target machine commonly involves booting the target machine over the network. Briefly, when the target machine is turned on, its firmware launches a network bootstrap loader that broadcasts a request for a network bootstrap program. The network bootstrap loader downloads the network bootstrap program from a source machine that has served the request. The network bootstrap program then downloads a deployment engine from the same source machine, which deployment engine, in turn, downloads the complete operating system.

The above-mentioned deployment process may also require multiple re-boots of the target machine. In this case, it is possible to upload an indication of a status of the deployment process onto the source machine; when the target machine re-boots, it retrieves the status of the deployment process (being reached before the re-boot) and then resumes it from that point (as described in U.S. Pat. No. 6,816,964, the entire disclosure of which is herein incorporated by reference).

However, a failure may occur at different points of the deployment process. A technique for addressing this problem is to reboot the target machine so as to repeat the whole deployment process. For example, this may be achieved by properly programming the network bootstrap program and the deployment engine; moreover, it is also possible to provide an additional processor on the target machine for detecting failures thereof (as described in GB-A-2446094, the entire disclosure of which is herein incorporated by reference).

Therefore, if the failure is due to a transient problem (for example, because of a network breakdown), the deployment process may succeed at its next attempt. However, if the failure is due to a persistent problem (for example, because of missing drivers in the operating system to be deployed) this generates an infinite loop of re-boots of the target machine. In order to alleviate this problem, a time-out is generally defined for the deployment process. The time-out is selected with a length substantially longer than the time that is normally required to complete the deployment process (for example, 1 hour against 45 minutes, respectively); therefore, the deployment process is determined to be in error when it does not complete within this time-out.

However, the above-described technique has several drawbacks. Indeed, any error can be detected only after the expiry of the entire time-out; this takes a relatively long time (to reduce the risk of detecting false errors), during which the target machine may have already executed many re-boots.

Moreover, this does not provide any indication at all about the cause of the error, therefore, the analysis of the error is quite difficult (especially when the target machine is remote and not accessible directly).

In any case, it is not possible to exclude the risk that the time-out is reached even when no actual error occurred—such as when the deployment process is slower than expected (for example, because of high network traffic); this causes the detection of false errors (which instead should solve automatically without any intervention).

BRIEF SUMMARY

According to one embodiment of the present invention, a method deploys an operating system. A deployment request is received from a target machine for an operating system on a source machine. An indication of a number of deployment requests received from the target machine without a completion of deployment of the operating system is stored in a memory. When the indication of a number of deployment requests is less than a predetermined number of deployment requests without completion of the deployment of the operating system, deployment of the operating system is enabled in response to each deployment request. When the indication of a number of deployment requests is equal to or greater than the predetermined number of deployment requests without completion of the deployment of the operating system, deployment of the operating system is refused in response to each deployment request.

According to one embodiment of the present invention, a system deploys an operating system. Instructions are received for a deployment request from a target machine for an operating system on a source machine. Instructions store an indication of a number of deployment requests received from the target machine without a completion of deployment of the operating system. When the indication of a number of deployment requests is less than a predetermined number of deployment requests without completion of the deployment of the operating system, instructions enable deployment of the operating system in response to each deployment request. When the indication of a number of deployment requests is equal to or greater than the predetermined number of deployment requests without completion of the deployment of the operating system, instructions refuse deployment of the operating system in response to each deployment request.

According to one embodiment of the present invention, a computer program product deploys an operating system. Computer readable program code is configured to receive a deployment request from a target machine for an operating system on a source machine. Computer readable program code is configured to store an indication of a number of deployment requests received from the target machine without a completion of deployment of the operating system. When the indication of a number of deployment requests is less than a predetermined number of deployment requests without completion of the deployment of the operating system, computer readable program code is configured to enable deployment of the operating system in response to each deployment request. When the indication of a number of deployment requests is equal to or greater than the predetermined number of deployment requests without completion of the deployment of the operating system, computer readable program code is configured to refuse deployment of the operating system in response to each deployment request.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
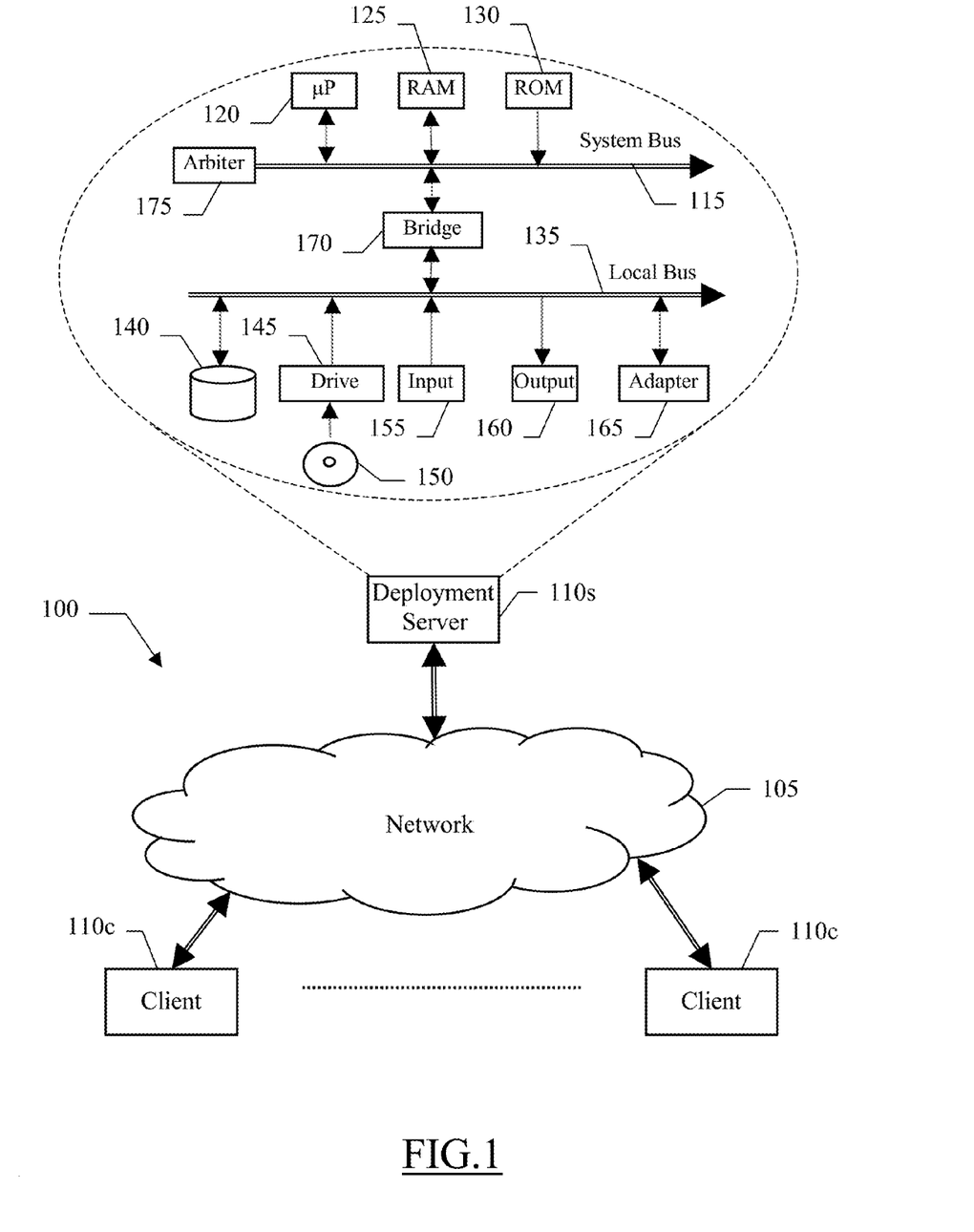
FIG. 1 shows a schematic block diagram of a data-processing system in which a solution according to an embodiment of the invention is applicable.

With reference to FIG. 1, a schematic block diagram is shown of a data-processing system 100 in which the solution according to an embodiment of the invention is applicable. The data-processing system 100 has a distributed architecture, which is based on a network 105, for example, a Local Area Network (LAN) or the Internet. Multiple (virtual or physical) machines are connected one to another through the network 105. Particularly, a source machine (or a deployment server) 110s controls the deployment of operating systems onto target machines 110c (for example, clients).

The deployment server 110s is formed by several units that are connected in parallel to a system bus 115. In detail, one or more microprocessors (μP) 120 control operation of the deployment server 110s; a RAM 125 is used as a working memory by the microprocessors 120, and a ROM 130 stores basic code for a bootstrap of the deployment server 110s. Several peripheral units are clustered around a local bus 135 (by respective interfaces). Particularly, a mass memory comprises one or more hard disks 140 and drives 145 for reading DVD- or CD-ROMs 150. Moreover, the deployment server 110s comprises input units 155 (for example, a keyboard and a mouse), and output units 160 (for example, a monitor and a printer). A network adapter 165 is used to connect the deployment server 110s to the network 105. A bridge unit 170 interfaces the system bus 115 with the local bus 135. Each microprocessor 120 and the bridge unit 170 may operate as master agents requesting an access to the system bus 115 for transmitting information. An arbiter 175 manages the granting of the access with mutual exclusion to the system bus 115.

Similar considerations apply to each client 110c (with a structure suitably scaled).

Figure 2A:
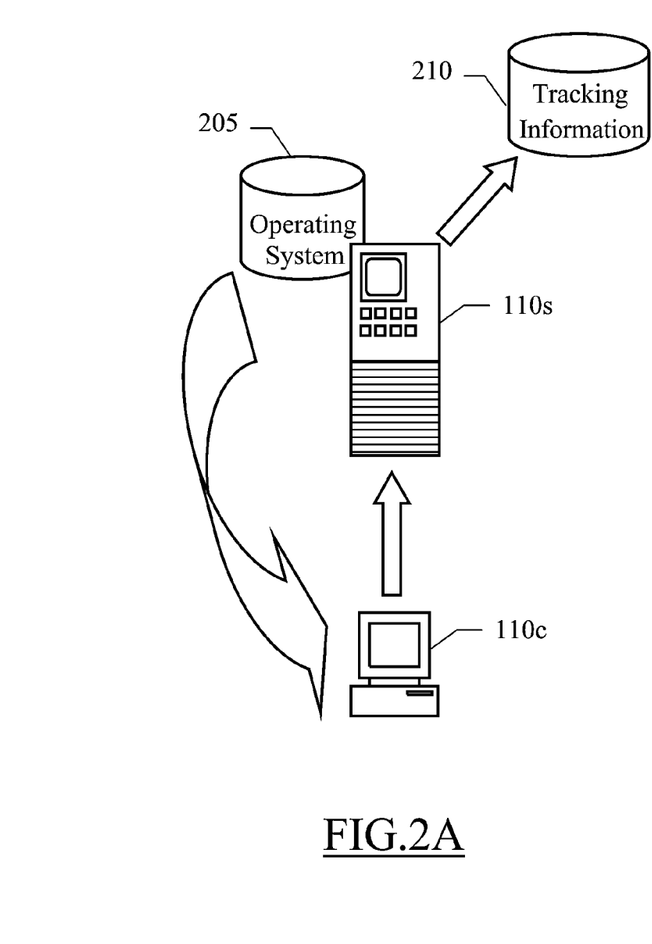
FIGS. 2A and 2B show an exemplary scenario of application of the solution according to an embodiment of the invention.
Figure 2B:
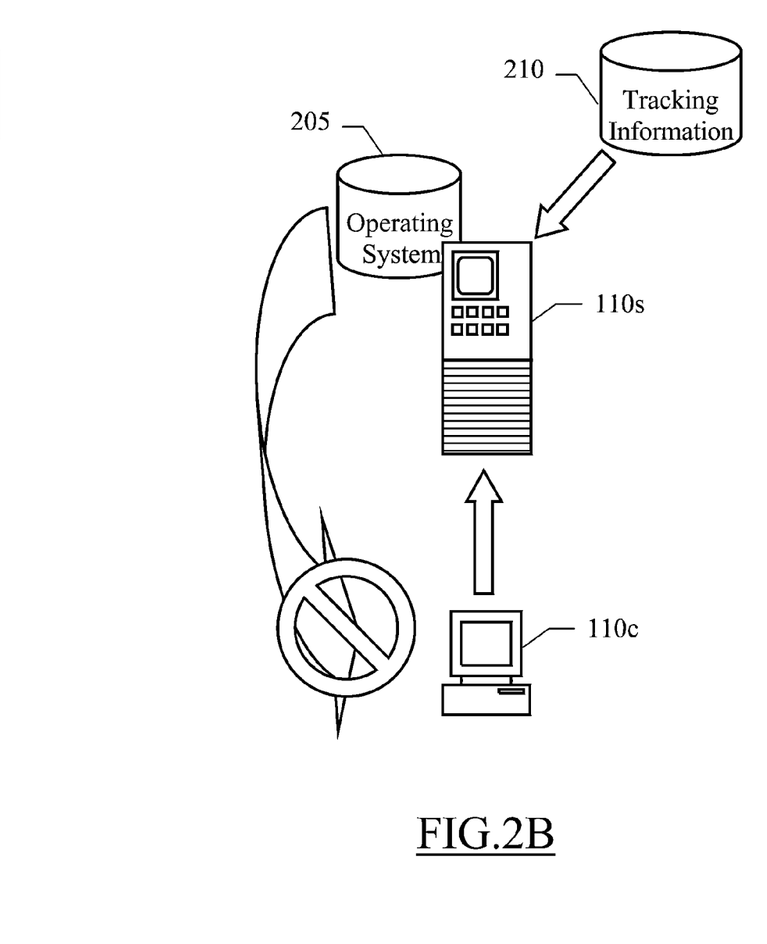

An exemplary scenario of application of the solution according to an embodiment of the invention is shown in FIG. 2A and FIG. 2B. Starting from the FIG. 2A, a generic client 110c submits a deployment request for a selected operating system 205 to the deployment server 110s (for example, by a network boot loader of its network adapter at the booting thereof). In response thereto, the deployment server 110s enables the deployment of the operating system 205 onto the client 110c. Moreover, in the solution according to an embodiment of the invention, the deployment server 110s also updates tracking information 210 indicative of an evolution of this deployment process (for example, indicating a number of deployment requests that have been submitted by the client 110c and progress of the deployment process).

Moving to FIG. 2B, if a failure occurs during the deployment process (for example, because of a network breakdown or of missing drivers) the client 110c re-boots and then submits a further deployment request for the same operating system 205 to the deployment server 110s. In the solution according to an embodiment of the invention, however, the deployment server 110s enables or refuses the further deployment of the operating system 205 onto the client 110c according to the tracking information 210 (for example, by refusing it after a predetermined number of deployment requests with no significant progress of the deployment process).

The above-described solution allows detecting any error in the deployment process after a relatively short time, so as to reduce the number of useless re-boots of the clients.

Moreover, this avoids, or at least substantially reduces, the risk of detecting false errors (for example, simply due to a slow-down of the deployment process).

Figure 3:
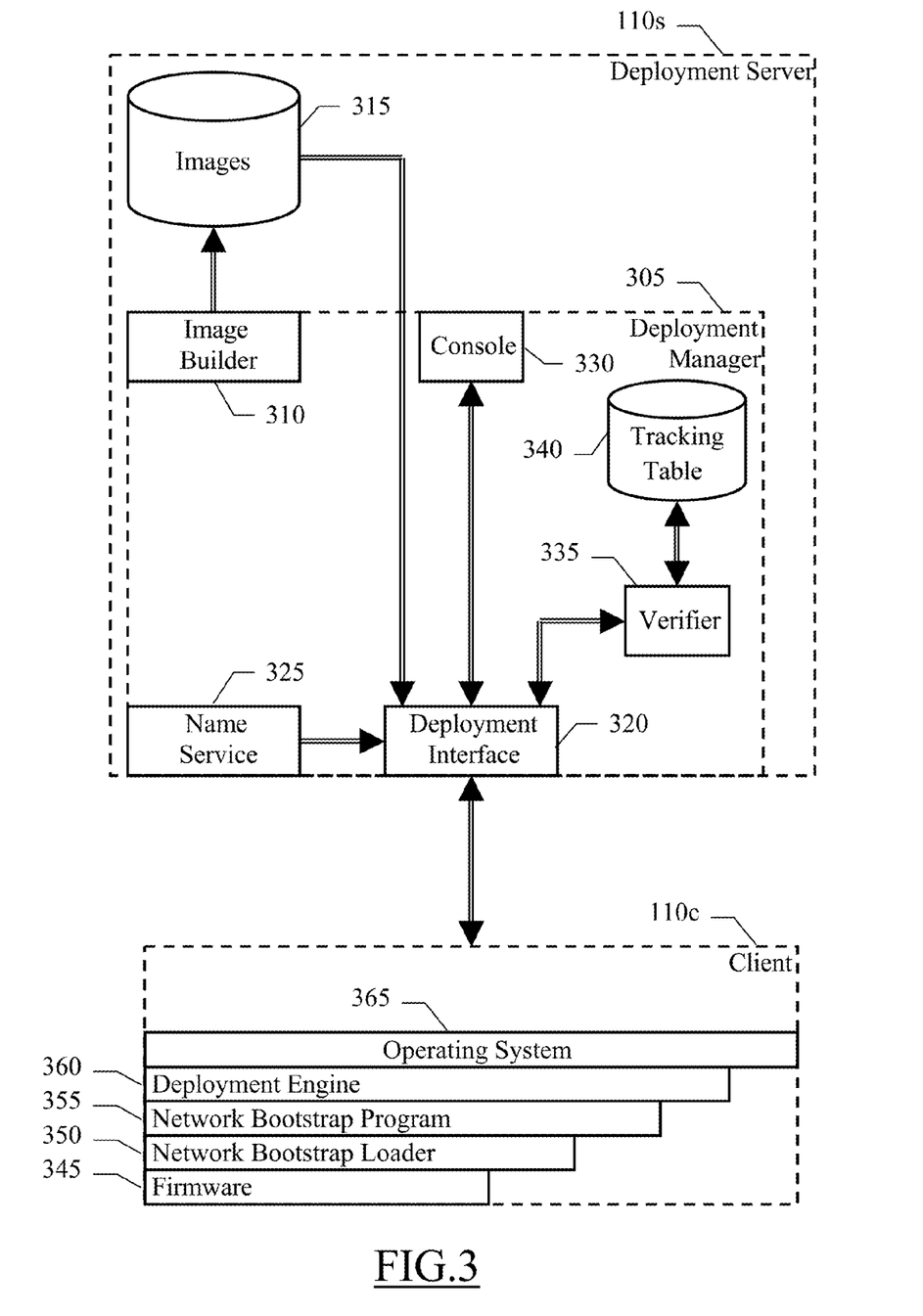
FIG. 3 shows the main software components that may be used to implement the solution according to an embodiment of the invention.

The main software components that may be used to implement the solution according to an embodiment of the invention are shown in the FIG. 3. Particularly, the deployment server 110s runs a deployment manager 305, for example, the IBM Tivoli Provisioning Manager for OS deployment (TPM-fOSd) by IBM Corporation (IBM and Tivoli are trademarks of IBM Corporation), which is used to automate the deployment of operating systems onto the clients 110c. The deployment manager 305 is typically stored on a hard disk and loaded (at least partially) into the working memory of the deployment server 110s when it is running, together with an operating system and other application programs (not shown in the figure). The deployment manager 305 is initially installed onto a hard disk, for example, from a DVD-ROM.

More specifically, the deployment manager 305 comprises an image builder 310. The image builder 310 captures an image of each operating system to be deployed (for example, from a reference machine suitably prepared); the images of the operating systems so obtained are stored into an image repository 315. The deployment manager 305 exposes a deployment interface 320, which is used to serve the deployment requests that are submitted to it by the clients 110c. For this purpose, the deployment interface 320 relies on a name service 325, for example, based on the Dynamic Host Configuration Protocol (DHCP), which assigns network addresses (for example, IP addresses) dynamically, upon request. A console 330 interfaces with the deployment interface 320. The console 330 is used by an operator of the deployment server 110s to control the deployment processes on the different clients 110c.

In the solution according to an embodiment of the invention, the deployment manager 305 also comprises a verifier 335. The verifier 335 controls a tracking table 340. For each deployment process in progress on a corresponding client 110c, the tracking table 340 comprises an entry that stores the corresponding tracking information. The verifier 335 interacts with the deployment interface 320 for receiving information that is used to update the tracking table 340 and for enabling or refusing each deployment request according to the corresponding tracking information.

A generic client 110c comprises firmware 345, for example, the Basic Input/Output System (BIOS), which is stored in its ROM. The firmware 345 is a basic program specifically designed for the hardware of the client 110c, which is only capable of setting up its units and then passing control of the client 110c to a bootstrap loader. The bootstrap loader is a simple program that is capable of starting the loading of an operating system into the RAM of the client 110c. Particularly, during the deployment process of a selected operating system, the firmware 345 passes control of the client 110c to a network bootstrap loader 350 that is embedded in its network adapter. The network bootstrap loader 350 downloads a Network Bootstrap Program (NBP) 355 from the deployment server 110s, for example, based on the Preboot Execution Environment (PXE) standard. The network bootstrap program 355 is a relatively simple program (being not specific to any operating system), which only relies on standard Application Program Interfaces (APIs) of the firmware 345 and is constrained to run in a simplified environment (for example, real mode with 16-bit addressing limited to 1 Mbytes of memory space). The network bootstrap program 355 prepares the client 110c for the actual deployment of the operating system, and then downloads a deployment engine 360 from the deployment server 110s, for example, the Windows Preinstallation Environment (WinPE), (Windows is a trademark of Microsoft Corporation). The deployment engine 360 is a simplified operating system capable of fully controlling the client 110c (requiring proper drivers to access its units). The deployment engine 360 downloads the (complete) operating system from the deployment server 110s (for example, Windows 7) and installs it onto the client 110c, wherein it is denoted with the reference numeral 365.

Figure 4A:
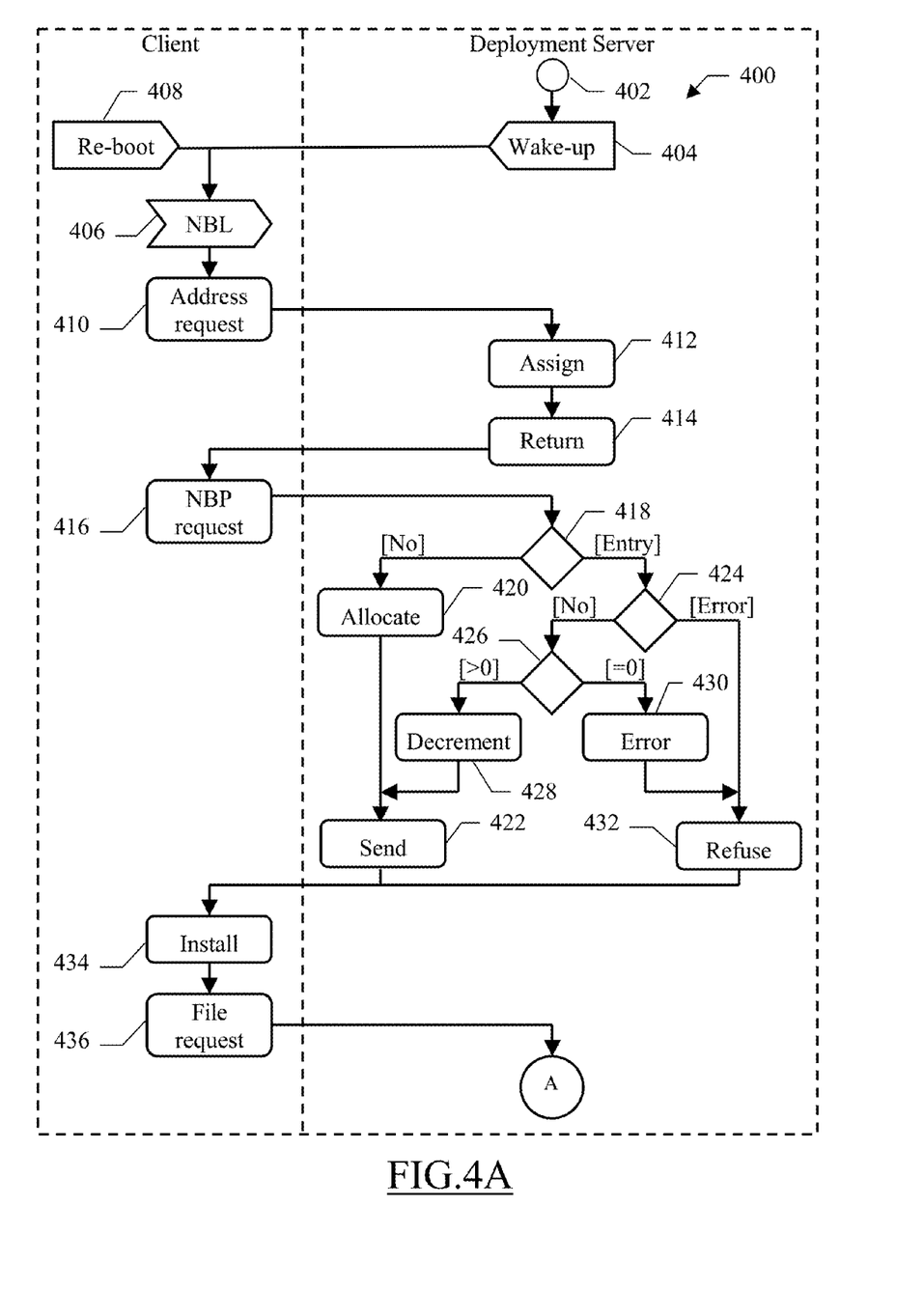
FIGS. 4A, 4B, and 4C show an activity diagram describing the flow of activities relating to an implementation of the solution according to an embodiment of the invention.
Figure 4B:
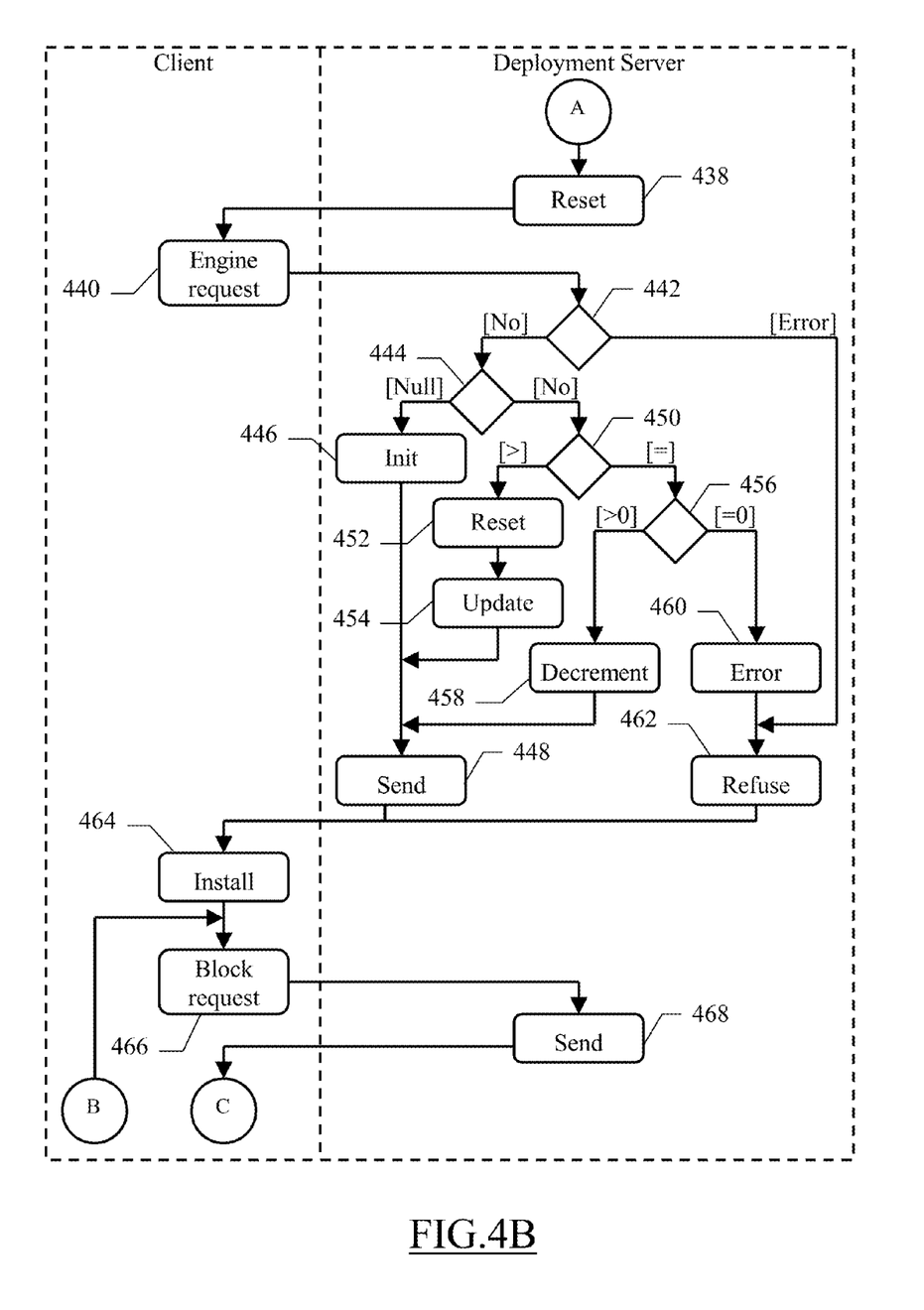
Figure 4C:
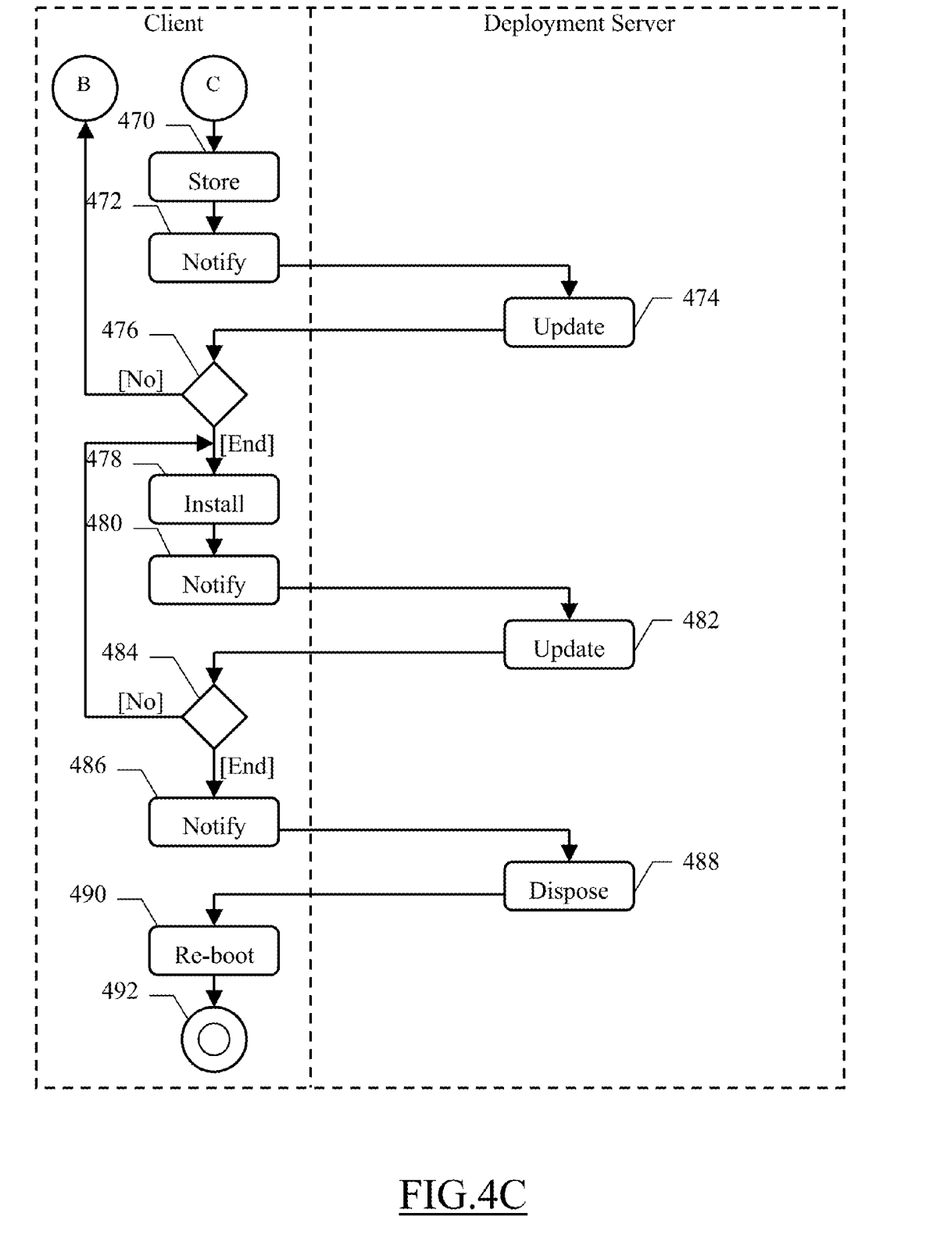

An activity diagram describing the flow of activities relating to an implementation of the solution according to an embodiment of the invention is shown in FIGS. 4A, 4B, and 4C. Particularly, the activity diagram represents an exemplary deployment 400.

The deployment 400 begins at start 402, and then passes to block 404 in the swim-lane of the deployment server as soon as a new operating system has to be deployed onto a specific client (for example, selected by the operator of the deployment server through the console of the deployment manager). In response thereto, the client is turned on, for example, remotely from the deployment server by a Wake on LAN (WoL) service.

Moving to block 406 in the swim-lane of the client, its firmware (i.e., the BIOS) is automatically executed. The firmware runs a Power-On Self Test (POST) to check and initialize the required units of the client, and then looks for a bootable unit (i.e., a unit with a predefined signature indicating the availability of a bootstrap loader thereon) through a predefined list. Assuming that the client is a pristine machine (with no operating system), the network adapter is reached in this list without finding any previous bootable unit. Therefore, the firmware launches the network bootstrap program that is stored therein. The same point is also reached from block 408 whenever the client is re-booted following any failure of the deployment process.

The deployment 400 continues to block 410, wherein the network bootstrap program broadcasts an address request (i.e., a DHCP request) over the network. The address request is served by the deployment server at block 412 (in the corresponding swim-lane); particularly, the deployment server (acting as a DHCP server) assigns a network address (i.e., an IP address) dynamically to the client, by selecting it from among a pool of available network addresses allocated thereto. Continuing to block 414, the deployment server returns a corresponding response to the client. Particularly, the deployment server returns the network address of the client (together with other configuration information, such as a subnet mask and a default gateway). The deployment server also returns a downloading address of the deployment server, i.e., a Trivial File Transfer Protocol (TFTP) address in the PXE standard and a filename of the network bootstrap program available at this downloading address. Referring back to the swim-lane of the client, the network bootstrap loader, at block 416, submits a bootstrap deployment request for downloading the network bootstrap program (NBP), identified by its filename, from the downloading address of the deployment server.

In response thereto, in an embodiment of the invention a test is made at block 418 in the swim-lane of the deployment server to verify whether an entry for the client (identified by the corresponding network address) exists in the tracking table. If not (i.e., this is the first time that the network bootstrap program is requested during the deployment process), a new entry of the tracking table is allocated at block 420 for the client. This entry comprises an error flag ERR, which indicates a condition of the corresponding deployment process. The error flag ERR is initially de-asserted (for example, to the logic value false) to indicate that the deployment process is not in error. The same entry also comprises a bootstrap counter, COUNTb, which indicates a number of times the network bootstrap program has been requested by the client without completing its downloading. The bootstrap counter, COUNTb, is initialized to a bootstrap threshold value (for example, in the range from 1 to 7, such as COUNTb=5) representing a maximum number of times the network bootstrap program may be further requested (without completing its downloading). Likewise, the entry comprises an engine counter, COUNTe, which indicates a number of times the deployment engine has been requested by the client without completing its downloading. The engine counter, COUNTe, is initialized to an engine threshold value (for example, again in the range from 1 to 7, such as COUNTe=5) representing a maximum number of times the deployment engine may be further requested (without completing its downloading). Moreover, the entry comprises a current gauge, GAUce, which indicates a current progress of the downloading of the operating system by the deployment engine and of the installation of the operating system onto the client, and a previous gauge, GAUpe, which indicates this progress at a previous request of downloading the deployment engine (for example, measured in percentage values). Initially, both the current gauge, GAUce, and the previous gauge, GAUpe, have a value indicating that the downloading of the operating system by the deployment engine has not started yet (for example, a null value). The deployment 400 then proceeds to block 422, wherein the network bootstrap program is sent to the client (i.e., by a succession of numbered data packets in the TFTP protocol).

Returning to block 418, if an entry for the client exists in the tracking table (i.e., the network bootstrap program has already been requested during the deployment process), the corresponding error flag ERR is retrieved at block 424. If the error flag ERR is de-asserted (meaning that the deployment process is not in error), the corresponding bootstrap counter, COUNTb, is retrieved at block 426. If the bootstrap counter, COUNTb, is higher than 0, the bootstrap counter, COUNTb, is decremented at block 428 (COUNTb=COUNTb−1). The deployment 400 then descends into the block 422, as above (to send the network bootstrap program to the client). Conversely, if the bootstrap counter, COUNTb, is equal to 0, this means that the number of times the network bootstrap program has been requested by the client (without completing its downloading) has reached the corresponding threshold value (i.e., 5). In this case, the deployment server at block 430 asserts the error flag, ERR, in the entry of the tracking table for the client (for example, to the logic value true), to indicate its error condition. At the same time, it is also possible to provide a warning message to the operator of the deployment server. The warning message may also comprise an indication of a source of the error (i.e., a failure in the downloading of the network bootstrap program). The deployment 400 then continues to block 432, wherein the downloading of the network bootstrap program onto the client is refused (for example, by returning an error message thereto). Referring back to the block 424, if the error flag, ERR, is asserted (meaning that the corresponding deployment process is in error), the flow of activity likewise descends into the block 432 (to refuse the downloading of the network bootstrap program).

The deployment 400 then proceeds to block 434 in the swim-lane of the client, from either the block 422 (downloading of the network bootstrap program enabled) or the block 432 (downloading of the network bootstrap program refused). In the first case, the network bootstrap loader installs the network bootstrap program onto the client (whereas in the second case the deployment process is aborted). In this phase, the flow of activity returns to the block 406 if any failure occurs, for example, because the downloading of the network bootstrap program has not been completed (such as because of a network problem). Once the network bootstrap program has been completely installed onto the client, and it has taken over its control, the event is notified to the deployment server at block 436. For this purpose, the network bootstrap program may submit a file request for downloading a pre-defined non-existing file from the same downloading address of the deployment server. In response thereto, the deployment server at block 438 (FIG. 4B) resets the bootstrap counter, COUNTb, in the corresponding entry of the tracking table to the corresponding threshold value (to enable the same number of requests of the network bootstrap program from the client for a next downloading thereof). Referring again to the swim-lane of the client at block 440, a corresponding error message is received from the deployment server (which error message is discarded by the network bootstrap program). The network bootstrap program then submits a request for downloading the deployment engine to the deployment server (either using the same TFTP protocol or any other communication protocol supported by the network bootstrap program).

In response thereto, in an embodiment of the invention the error flag, ERR, is retrieved at block 442 from the entry of the tracking table for the client (always existing after the downloading of the network bootstrap program). If the error flag, ERR, is de-asserted (meaning that the deployment process is not in error), the corresponding current gauge, GAUce, is retrieved at block 444. If the current gauge, GAUce, has the null value indicating that the downloading of the operating system has not been started yet (i.e., this is the first time that the deployment engine is requested during the deployment process), at block 446 the current gauge, GAUce, and the previous gauge, GAUpe, are both initialized to a value corresponding to the beginning of the downloading of the operating system (i.e., 0%). The deployment 400 then proceeds to block 448, wherein the deployment engine is sent to the client (using the communication protocol supported by the network bootstrap program).

Returning to the block 444, if the current gauge, GAUce, is not a null value (i.e., the deployment engine has already been requested during the deployment process), the corresponding previous gauge, GAUpe, is retrieved at block 450. If the current gauge, GAUce, is higher than the previous gauge, GAUpe (to indicate a progress of the downloading/installation of the operating system), the flow of activity passes to block 452 wherein the engine counter, COUNTe, is reset to the corresponding threshold value (to enable the same number of requests of the deployment engine from the client for a next downloading thereof). Proceeding to block 454, the previous gauge, GAUpe, is updated according to the current gauge, GAUce, i.e., GAUpe=GAUce (to store the new progress of the downloading/installation of the operating system). The deployment 400 then descends into the block 448, as above (to send the deployment engine to the client). Referring back to block 450, if the current gauge, GAUce, is equal to the previous gauge, GAUpe (to indicate no progress of the downloading/installation of the operating system), the corresponding engine counter, COUNTe, is retrieved at block 456. If the engine counter, COUNTe, is higher than 0, the engine counter, COUNTe, is decremented at block 458 (COUNTe=COUNTe−1). The method 400 then descends into the block 448, as above (to send the deployment engine to the client). Conversely, if the engine counter, COUNTe, is equal to 0, this means that the number of times the deployment engine has been requested by the client (with no progress of the downloading/installation of the operating system) has reached the corresponding threshold value (i.e., 5), in other words, the deployment process always fails at the same point. In this case, the deployment server at block 460 asserts the error flag, ERR, in the entry of the tracking table for the client (to indicate its error condition). As above, it is also possible to provide a warning message to the operator of the deployment server, which warning message may also comprise an indication of a source of the error (i.e., a failure in the downloading of the operating system by the deployment engine at the point indicated by the previous gauge, GAUpe). The deployment 400 then continues to block 462, wherein the downloading of the deployment engine onto the client is refused (for example, by returning an error message thereto). Referring back to the block 442, if the error flag, ERR, is asserted (meaning that the corresponding deployment process is in error), the flow of activity likewise descends into the block 462 (to refuse the downloading of the deployment engine).

The deployment 400 then proceeds to block 464 in the swim-lane of the client, from either the block 448 (downloading of the deployment engine enabled) or the block 462 (downloading of the deployment engine refused). In the first case the network bootstrap program installs the deployment engine onto the client (whereas in the second case the deployment process is aborted). In this phase, the flow of activity returns to the block 406 (FIG. 4A) if any failure occurs, for example, because the downloading of the deployment engine has not been completed (such as because of a network problem). Once the deployment engine has been completely installed onto the client and it has taken over its control, a loop is entered at block 466 to download the operating system. For this purpose, a block request for downloading a new block of the operating system is submitted to the deployment server (using any communication protocol supported by the deployment engine). In response thereto, at block 468 the deployment server sends the required block of the operating system to the client. Continuing to block 470 (FIG. 4C), the deployment engine stores this block of the operating system into the mass memory of the client. In this case, as well, the flow of activity returns to the block 406 (FIG. 4A), if any error occurs, for example, because of a connection problem with the deployment server, a network problem, or any problem of the deployment engine (such as missing drivers required to manage the units of the client). From time to time, the deployment engine at block 472 notifies the current progress of the downloading of the operating system to the deployment server (for example, after the downloading of every predefined number of blocks of the operating systems, down to a single one, or periodically). In response thereto, the deployment server at block 474 updates the current gauge, GAUce, accordingly.

A test is then made at block 476 in the swim-lane of the client to verify whether the downloading of the operating system has been completed. If not, the flow of activity returns to the block 464 (FIG. 4B) to request the downloading of a further block of the operating system. Conversely, the loop is exited by descending into block 478, wherein the operating system, so downloaded, is installed onto the client (by launching a suitable installer included therein). In this case, as well, the flow of activity returns to the block 406 (FIG. 4A) if any error occurs, for example, when the operating system does not include the proper drivers required to manage the units of the target machine. From time to time, the progress of the installation of the operating system onto the client is notified to the deployment server at block 480 (for example, by providing corresponding commands to be executed at predefined stages of the installation to the installer). In response thereto, the deployment server at block 482 updates the current gauge, GAUce, accordingly. If during the installation of the operating system any re-booting of the client is required, the deployment 400 returns to the block 406 (FIG. 4A), as above. In this case, the downloading of the network bootstrap program and the downloading of the deployment engine are performed as usual without any problem (since the downloading of the network bootstrap program, of the deployment engine, and of the operating system was previously completed, and the installation of the operating system is progressing, so that no error is detected).

A test is then made at block 484 in the swim-lane of the client to verify whether the installation of the operating system has been completed. If not, the flow of activity returns to the block 478 to continue installing the operating system and notifying its progress to the deployment server. Conversely, the loop is exited by descending into block 486. In this phase, the completion of the installation of the operating system (and then of the deployment process) is notified to the deployment server (for example, by providing a corresponding command to be executed at the end of the installation to the installer). In response thereto, the deployment server at block 488 disposes of the entry of the tracking table for the client (to enable possible next deployment processes onto the client). Returning to the swim-lane of the client, the deployment engine turns off and then turns on the client at block 490. Therefore, its firmware now finds a local boot loader of the operating system in its mass memory, so that it boots locally from it. The local boot loader then loads the desired operating system. The deployment 400 ends (after the completion of the deployment process) at 492.

Conversely, when the deployment process is aborted, the operator of the deployment server may dig into the cause of the error and take appropriate steps to remedy the situation. Once the corresponding problem has been solved, the entry of the tracking table for the client is disposed of, so as to enable a further attempt of deploying the same operating system onto the client.

The specific embodiment of the invention described above is particularly advantageous since the control of the downloading of the network bootstrap program is simply based on the number of times it has been requested (since it is unlikely to have failures because of its very simple structure). The control of the downloading of the deployment engine is instead based on the number of times it has been requested without any substantial progress of the downloading/installation of the operating system (so that it is enabled only if the deployment process is progressing).

Moreover, the warning message that is returned to the operator may provide a clear indication of the cause of any error. Particularly, in this case it is possible to know whether the error is due to the downloading of the network bootstrap program or to the downloading of the deployment engine. Moreover, in the latter case, it is also possible to know at which point the downloading of the operating system cannot proceed further. All of the above strongly facilitates the analysis of the error by the operator (who may retry the deployment process and closely monitor the relevant portion thereof, only), especially when the clients are remote and not directly accessible.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible (for example, with respect to numerical values). Particularly, different embodiments of the invention may be practiced without the specific details set forth in the preceding description which provide a more thorough understanding thereof; conversely, well-known features may have been omitted or simplified in order not to obscure the description with unnecessary particulars. Moreover, it is expressly intended that specific elements and/or steps described in connection with any embodiment of the disclosed solution may be incorporated in any other embodiment as a matter of general design choice.

In any case, the terms include, comprise, have and contain (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

The proposed method may be use to deploy whatever operating systems—for example, Linux (trademark of Linux Trademark Institute). Moreover, the operating system may be deployed onto any (physical or virtual) target machine, even with an operating system already installed thereon. Likewise, the method may be performed under the control of any source (physical or virtual) machine, for example, a peer machine during a migration of an operating system from it to the target machine. More generally, the same solution may be applied to any other deployment technique, for example, based on any number of stages (down to a single one) involving the submission of corresponding deployment requests that are enabled or refused selectively. The deployment process may also be started by turning-on the client manually, or by turning-off the client remotely (if a suitable agent is installed thereon) and then forcing it to boot over the network.

Any other criteria may be used to enable or to refuse the deployment of the operating system according to the tracking information. For example, in a very simplified embodiment of the invention, this decision is based only on the number of generic deployment requests of the operating system that are received from the client without its completion (with the deployment that is refused after a predetermined number of them, down to a single one).

Alternatively, the same decision may be based only on a generic progress of the deployment process (with the deployment that is refused if there is no significant progress thereof).

The two criteria mentioned-above (i.e., the number of deployment requests and the progress of the deployment process) may be combined in any other way (for example, by considering the deployment process progressing only if the difference between the current progress and the previous progress exceeds a minimum value).

Similar considerations apply to any other network booting procedure, even controlled by a network bootstrap loader embedded in the BIOS (for example, based on the RIPL, gPXE, PXELinux, and the like); in any case, the specific control on the downloading of the network bootstrap program may also be avoided (by including it into the control of the downloading of the deployment engine).

The bootstrap counter (or any equivalent indicator of the number of requests of downloading the network bootstrap program being received from the client without a completion of its downloading) may also be pre-allocated (for example, when the clients are known at priori).

The completion of the downloading of the network bootstrap program may be notified to the deployment server in any other way (for example, by means of a dedicated message); in any case, this event may be inferred even without any specific notification (for example, simply in response to the request of downloading the deployment engine).

Similar considerations apply to any other deployment engine (for example, BartPE, or a stripped-down version of Linux); in any case, the operating system may be downloaded from any other repository, even separate from the source machine.

The engine counter, the current gauge and the previous gauge (or any equivalent indicator of the number of requests of downloading the deployment engine being received from the client without its completion, of the current progress of the downloading of the operating system by the deployment engine and/or the installation of the operating system onto the client, and of this progress at a previous request of the deployment engine, respectively) may be allocated only in response to a first request of downloading the deployment engine, or they may also be pre-allocated (together with the bootstrap counter). Moreover, the control of the progress of the downloading/installation of the operating system may be implemented in a different way, for example, by including an indication of the current progress of the downloading of the operating system into each request of a block thereof and then only storing an indication of its previous progress on the deployment server (with this information that may also be defined simply by the number of the block of the operating system being downloaded). In any case, the possibility of only monitoring the downloading of the operating system by the deployment engine or the installation of the operating system onto the client is not excluded.

Any other procedure may be used to update the current gauge (for example, by monitoring the requests of downloading the blocks of the operating system being received from the client directly on the deployment server).

The completion of the downloading/installation of the operating system may be detected in any other way, even without the need of any dedicated notification (for example, by the above-mentioned monitoring on the deployment server); moreover, nothing prevents simply resetting the tracking information in response thereto (without disposing of it).

The program that implements the proposed solution on the deployment server (or on any equivalent data-processing system) may be implemented as a stand-alone module, as a plug-in for the deployment manager, or even directly in the deployment manager itself. It would be readily apparent that it is also possible to deploy the same solution as a service. In any case, similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or micro-code (either in object code or in source code, for example, to be compiled or interpreted).

Similar considerations apply if the system wherein the above-described solution may be implemented has a different structure or comprises equivalent components, or it has other operating characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries.

Having thus described the invention of the present application in detail and by reference to embodiments thereof, it will be apparent that modifications and variations are possible without departing from the scope of the invention defined in the appended claims.

What is claimed is:

1. A method of deploying an operating system, comprising:
receiving a deployment request from a target machine for an operating system on a source machine;
storing, in a memory on said source machine, an indication of a number of deployment requests received from said target machine without a completion of deployment of the operating system on said target machine, wherein completion of deployment comprises downloading said operating system to said target machine and installing said operating system onto said target machine;
said receiving a deployment request comprises receiving a request for downloading of a deployment engine, and wherein said indication of a number of deployment requests comprises an engine counter indicative of a number of engine deployment requests received from said target machine without completion of downloading of said deployment engine, a current gauge indicative of a current progress of a downloading of the operating system by said deployment engine up to, but not including, a completion of deployment of the operating system onto said target machine at a current engine deployment request, and a previous gauge indicative of a progress of downloading the operating system by said deployment engine up to, but not including, a completion of deployment of the operating system onto said target machine at a previous engine deployment request;
when said current gauge from said current engine deployment request is indicative of a progress with respect to said previous gauge from said previous engine deployment request, resetting said engine counter, updating said previous gauge according to said current gauge and enabling downloading of said deployment engine;

when said current gauge from said current engine deployment request is indicative of no progress with respect to said previous gauge from said previous engine deployment request, and when said engine counter is less than an engine threshold value, updating said engine counter accordingly and enabling downloading of said deployment engine; and when said current gauge from said current engine deployment request is indicative of no progress with respect to said previous gauge from said previous engine deployment request, and when said engine counter is equal to or greater than said engine threshold value, refusing downloading of said deployment engine.

2. The method of claim 1, wherein receiving a deployment request further comprises receiving bootstrap deployment request for a downloading of a network bootstrap program, and wherein said indication of a number of deployment requests further comprises a bootstrap counter indicative of a number of bootstrap deployment requests being received from said target machine without a completion of the downloading of the network bootstrap program:

when said bootstrap counter is less than a bootstrap threshold value, updating said bootstrap counter and enabling downloading of said network bootstrap program; and when said bootstrap counter is equal to or greater than said bootstrap threshold value, refusing downloading of said network bootstrap program.

3. The method of claim 2, further comprising:

receiving a bootstrap completion notification indicative of completion of downloading said network bootstrap program from said target machine; and resetting said bootstrap counter in response to said bootstrap completion notification.

4. The method of claim 1, further comprising:

receiving a progress notification indicative of a current progress from the target machine; and updating said current gauge according to said progress notification.

5. A system for deploying an operating system, comprising:

a processor; and memory connected to the processor, wherein the memory is encoded with instructions and wherein the instructions when executed comprise:

instructions for receiving a deployment request from a target machine for an operating system on a source machine;

instructions for storing on said source machine, an indication of a number of deployment requests received from said target machine without a completion of deployment of the operating system on said target machine, wherein completion of deployment comprises downloading said operating system to said target machine and installing said operating system onto said target machine;

said instructions for receiving a deployment request comprises instructions for receiving a request for downloading of a deployment engine, and wherein said indication of a number of deployment requests comprises an engine counter indicative of a number of engine deployment requests received from said target machine without completion of downloading of said deployment engine, a current gauge indicative of a current progress of a downloading of the operating system by said deployment engine up to, but not including, a completion of deployment of the operating system onto said target machine at a current engine deployment request, and a previous gauge indicative of a progress of downloading the operating system by said deployment engine up to but not including a completion of deployment of the operating system onto said target machine at a previous engine deployment request;

when said current gauge from said current engine deployment request is indicative of a progress with respect to said previous gauge from said previous engine deployment request, instructions for resetting said engine counter, updating said previous gauge according to said current gauge and enabling downloading of said deployment engine;

when said current gauge from said current engine deployment request is indicative of no progress with respect to said previous gauge from said previous engine deployment request, and when said engine counter is less than an engine threshold value, instructions for updating said engine counter accordingly and enabling downloading of said deployment engine; and when said current gauge from said current engine deployment request is indicative of no progress with respect to said previous gauge from said previous engine deployment request, and when said engine counter is equal to or greater than said engine threshold value, instructions for refusing downloading of said deployment engine.

6. The system of claim 5, wherein said instructions for receiving a deployment request further comprises instructions for receiving a bootstrap deployment request for a downloading of a network bootstrap program, and wherein said indication of a number of deployment requests further comprises a bootstrap counter indicative of a number of bootstrap deployment requests being received from said target machine without a completion of the downloading of the network bootstrap program:

when said bootstrap counter is less than a bootstrap threshold value, instructions for updating said bootstrap counter and enabling downloading of said network bootstrap program; and when said bootstrap counter is equal to or greater than said bootstrap threshold value, instructions for refusing downloading of said network bootstrap program.

7. The system of claim 6, further comprising:

instructions for receiving a bootstrap completion notification indicative of completion of downloading said network bootstrap program from said target machine; and instructions for resetting said bootstrap counter in response to said bootstrap completion notification.

8. The system of claim 5, further comprising:

instructions for receiving a progress notification indicative of a current progress from the target machine; and instructions for updating said current gauge according to said progress notification.

9. A computer program product for deploying an operating system, the computer program product comprising a non-transitory computer readable storage medium having computer readable program code embodied therewith, the computer readable program code comprising:

computer readable program code configured to receive a deployment request from a target machine for an operating system on a source machine;

computer readable program code configured to store on said source machine, an indication of a number of deployment requests received from said target machine without a completion of deployment of the operating system on said target machine, wherein completion of deployment comprises downloading said operating system to said target machine and installing said operating system onto said target machine;

said computer readable program code configured to receive a deployment request further comprises computer readable program code configured to receive a request for downloading of a deployment engine, and wherein said indication of a number of deployment requests comprises an engine counter indicative of a number of engine deployment requests received from said target machine without completion of downloading of said deployment engine, a current gauge indicative of a current progress of a downloading of the operating system by said deployment engine up to, but not including, a completion of deployment of the operating system onto said target machine at a current engine deployment request, and a previous gauge indicative of a progress of downloading the operating system by said deployment engine up to, but not including, a completion of deployment of the operating system onto said target machine at a previous engine deployment request;

when said current gauge from said current engine deployment request is indicative of a progress with respect to said previous gauge from said previous engine deployment request, computer readable program code configured to reset said engine counter, update said previous gauge according to said current gauge and enable downloading of said deployment engine;

when said current gauge from said current engine deployment request is indicative of no progress with respect to said previous gauge from said previous engine deployment request, and when said engine counter is less than an engine threshold value, computer readable program code configured to update said engine counter accordingly and enable downloading of said deployment engine; and when said current gauge from said current engine deployment request is indicative of no progress with respect to said previous gauge from said previous engine deployment request, and when said engine counter is equal to or greater than said engine threshold value, computer readable program code configured to refuse downloading of said deployment engine.

10. The computer program product of claim 9, wherein said computer readable program code configured to receive a deployment request further comprises computer readable program code configured to receive a bootstrap deployment request for a downloading of a network bootstrap program, and wherein said indication of a number of deployment requests further comprises a bootstrap counter indicative of a number of bootstrap deployment requests being received from said target machine without a completion of the downloading of the network bootstrap program:

when said bootstrap counter is less than a bootstrap threshold value, computer readable program code configured to update said bootstrap counter and enabling downloading of said network bootstrap program; and when said bootstrap counter is equal to or greater than said bootstrap threshold value, computer readable program code configured to refuse downloading of said network bootstrap program.

11. The computer program product of claim 10, further comprising:

computer readable program code configured to receive a bootstrap completion notification indicative of completion of downloading said network bootstrap program from said target machine; and computer readable program code configured to reset said bootstrap counter in response to said bootstrap completion notification.

12. The computer program product of claim 9, further comprising:

computer readable program code configured to receive a progress notification indicative of a current progress from the target machine; and computer readable program code configured to update said current gauge according to said progress notification.

* * * * *